(12) United States Patent
Vemuri

(10) Patent No.: US 9,128,971 B2
(45) Date of Patent: *Sep. 8, 2015

(54) METHOD AND SYSTEM FOR PERFORMING COUNT-DISTINCT QUERIES IN A LARGE DATA SET THAT STORES PRESENCE BITMAPS CORRESPONDING TO DIFFERENT TIME PERIODS

(71) Applicant: LinkedIn Corporation, Mountain View, CA (US)

(72) Inventor: Srinivas S. Vemuri, Santa Clara, CA (US)

(73) Assignee: LinkedIn Corporation, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/284,121

(22) Filed: May 21, 2014

(65) Prior Publication Data

US 2015/0161186 A1 Jun. 11, 2015

Related U.S. Application Data

(63) Continuation of application No. 14/101,029, filed on Dec. 9, 2013, now Pat. No. 8,825,656.

(51) Int. Cl.
*G06F 7/00* (2006.01)
*G06F 17/30* (2006.01)

(52) U.S. Cl.
CPC .............................. *G06F 17/30324* (2013.01)

(58) Field of Classification Search
None
See application file for complete search history.

(56) References Cited

U.S. PATENT DOCUMENTS

| | | | |
|---|---|---|---|
| 5,761,652 A | 6/1998 | Wu et al. | |
| 6,470,490 B1 * | 10/2002 | Hansen | 717/106 |
| 7,047,230 B2 | 5/2006 | Gibbons | |
| 2004/0260671 A1 * | 12/2004 | Potter et al. | 707/1 |
| 2005/0177553 A1 * | 8/2005 | Berger et al. | 707/3 |
| 2013/0246438 A1 | 9/2013 | Gestrelius et al. | |
| 2014/0006411 A1 * | 1/2014 | Boldyrev et al. | 707/741 |

* cited by examiner

*Primary Examiner* — Uyen Le
(74) *Attorney, Agent, or Firm* — Park, Vaughan, Fleming & Dowler LLP

(57) ABSTRACT

A system, method, and apparatus are provided for supporting and/or executing count-distinct queries. A large set of data (e.g., tens or hundreds of millions of event records) is condensed daily to generate presence bitmaps to reflect the distinctiveness of a selected data dimension S (e.g., user ID) for one or more key dimensions g1, g2, . . . (e.g., advertisement ID, campaign ID, advertiser ID). The condensation process eliminates duplication and yields a single value (e.g., 1 or 0) for each tuple [S, g1, . . . ] to represent the distinctiveness of each value in the S dimension to each combination of values in the grouping dimensions. On a monthly basis, the daily values are condensed to yield a single value for the month, and a similar process is applied on any other desired time granularities (e.g., year). The condensed data may be generated for any combination of selected dimension(s) and grouping dimension(s).

20 Claims, 5 Drawing Sheets

METHOD AND SYSTEM FOR PERFORMING COUNT-DISTINCT QUERIES IN A LARGE DATA SET THAT STORES PRESENCE BITMAPS CORRESPONDING TO DIFFERENT TIME PERIODS

RELATED APPLICATION

This application is a continuation of and claims priority under 35 U.S.C. §120 to U.S. Pat. No. 8,825,656, filed Dec. 9, 2013.

BACKGROUND

This invention relates to the field of computer systems. More particularly, a system, method, and apparatus are provided for organizing large quantities of multi-dimensional data in support of count-distinct queries executed against the data.

A count-distinct query executed against a set of multi-dimensional data returns a count of the number of unique values for one or more specified dimensions. For example, an illustrative collection of data might encompass all ten-digit telephone numbers in use across the United States, and include dimensions such as area code, prefix (i.e., the three digits that follow the area code), a geographic area (if any) in which the number is situated, etc. Illustrative count-distinct queries might therefore be executed against this data to find the number of distinct area codes in the U.S., the number of unique prefixes within one or more area codes, etc.

Count-distinct queries can become time-intensive and resource-intensive when the data grows very large. For example, consider a collection of data encompassing all electronic mail messages dispatched within a day, a week or some other time period. An illustrative count-distinct query may attempt to identify how many unique subject lines were found within e-mail messages sent to or from a particular domain, or among messages of a particular size, etc. This query would have to not only identify all relevant data records or elements, such as all messages to or from the target domain, but also eliminate duplicates so that after a unique subject is identified, all other relevant messages having the same subject line are ignored.

In today's computing environment, computing systems hosting messaging services, retailers, news sources, social networking sites, and/or other services process incredible amounts of data. Count-distinct queries within these systems may normally take significant amounts of time (e.g., many minutes, hours), depending on the amount of data being queried. In any system in which these types of queries must be executed on regular or frequent bases, the time it takes to receive a query's results may negatively affect system operations.

DETAILED DESCRIPTION

The following description is presented to enable any person skilled in the art to make and use the disclosed embodiments, and is provided in the context of one or more particular applications and their requirements. Various modifications to the disclosed embodiments will be readily apparent to those skilled in the art, and the general principles defined herein may be applied to other embodiments and applications without departing from the scope of those that are disclosed. Thus, the invention associated with this disclosure is not intended to be limited to the embodiments shown, but rather is to be accorded the widest scope consistent with the disclosure.

In some embodiments, a system, method, and apparatus are provided for supporting and/or performing count-distinct queries on a large collection of data. In these embodiments, a count-distinct query returns or identifies the number of unique values (the "reach") for a particular dimension of the data.

In a database having a schema that features multiple columns or fields, an embodiment described herein may be applied to facilitate and/or execute a count-distinct query to identify the number of unique data values in a selected column, across some or all database records. For example, if the database is operated by an online content provider to record data regarding music files downloaded by users, the database schema may include columns such as user ID, song title, artist, timestamp (identifying when the download occurred), etc. The content provider may wish to use count-distinct queries to determine various aspects of the service's reach, such as how many different songs were downloaded since the service started, how many different songs were downloaded during a particular week, how many different songs by a particular artist were downloaded during a particular day, etc.

In some embodiments, efficient count-distinct queries are enabled by aggregating and condensing a large collection of original, raw, data. For example, and assuming that count-distinct queries often include a time component (e.g., to query data within different time periods), original data may be aggregated for or within different periods (e.g., days, weeks, months, years) and then condensed and represented in a manner that retains distinctness and eliminates duplication. Then, when a query is initiated, it can be executed against the condensed data and finish much more rapidly than a count-distinct query executed against the entire collection of raw data. Data may alternatively be condensed in a dimension other than time.

Embodiments described herein may include multiple processes that operate sequentially and/or in parallel. Illustratively, one or more such processes function to condense raw data on the basis of time or some other data dimension, and one or more other processes may support or execute count-distinct queries against the condensed data or a representation of the condensed data.

Figure 1:
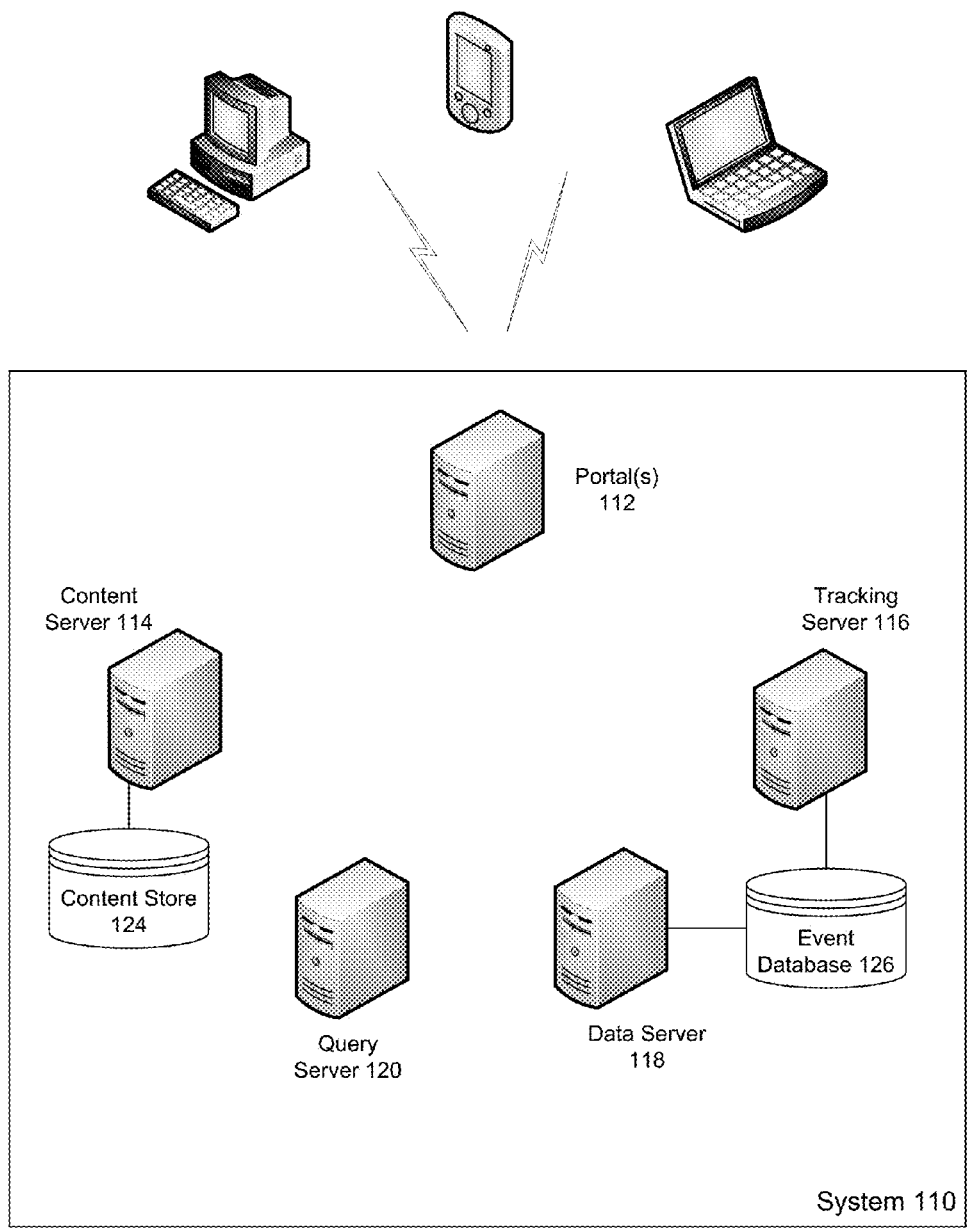
FIG. 1 is a block diagram of a system for supporting count-distinct queries, in accordance with some embodiments.

FIG. 1 is a block diagram of a system for supporting count-distinct queries, according to some embodiments. System 110 may be implemented as or within a data center or other computing system operated by an online service.

In some particular implementations, system 110 is implemented within a professional social networking system that helps members create, develop and maintain professional (and personal) relationships, as provided by LinkedIn® Corporation, for example.

Members or users of a service offered by system 110 connect to the system via client devices, which may be stationary (e.g., desktop computer, workstation) or mobile (e.g., smart phone, table computer, laptop computer). The client devices may operate a suitable client application, such as a browser program or an application designed specifically to access the service(s) offered by system 110. Users of system 110 may be termed members because they may be required to register with the system in order to fully access the system's services.

User connections are generally made through a portal 112, which may comprise an application server, a web server, and/or some other gateway or entry point. System 110 also includes one or more of content server 114, tracking server 116, data server 118, query server 120, content store 124, and event database 126.

As part of the services it offers, system 110 serves content for presentation to users via their client devices. The content that is served may include advertisements, offers, announcements, job listings, status updates, content generated or suggested by other users (e.g., images, video, audio, messages), and so on.

Organizations may also be members of the service (i.e., in addition to individuals), and may have associated descriptions or profiles comprising attributes such as industry (e.g., information technology, manufacturing, finance), size, location, goal, etc. An "organization" may be a company, a corporation, a partnership, a firm, a government agency or entity, a not-for-profit entity, an online community (e.g., a user group), or some other entity formed for virtually any purpose (e.g., professional, social, educational).

Members of the service have corresponding pages (e.g., web pages, content pages) on system 110, which they may use to facilitate their activities with the system and with each other. These pages are available to some or all other members to visit in order to browse messages, announcements and/or other information provided by the corresponding member.

Tracking server 116 monitors and records (e.g., in event database(s) 126) activity of system 110 and/or members. For example, whenever content is served from portal 112 or content server 114 (e.g., to a client device), the tracking server may record what is served, to whom (e.g., which member), when it was served, and/or other information. Similarly, the tracking server also records member actions regarding advertisements and/or other content presented to the members, to include identities of the member and the content acted upon, what action was taken (e.g., click, conversion, follow-on request, visiting a page associated with a subject or provider of the content), when the action was taken, etc.

Content server 114 maintains one or more repositories of content items for serving to members (e.g., content store 124), an index of the content items, and/or other information useful in serving content to members. Illustratively, content server 114 may serve on the order of hundreds of millions of content items every day, for each of which tracking server 116 stores an event record.

Content store 124 may include various types of content and content items, including advertisements (e.g., both revenue and non-revenue ads), information (e.g., announcements, messages) released by members (and possibly non-members), status updates, job listings, media content (e.g., images, video, audio), documents, and so on, for serving to members and/or for use by various components of system 110. Content server 114 (or some other component of system 110) may include a recommendation module for recommending content to serve to a member.

When content is stored in content store 124, it may be stored with attributes, indications, characteristics and/or other information describing one or more target audiences of the content. For example, a provider of an advertisement may identify relevant attributes and desired values of target members, a provider of a job listing may identify attributes of members that should be informed of the opening, an organization wishing to obtain more followers/subscribers/fans may identify the type(s) of members it would like to attract, and so on.

As described in more detail below, data server 118 operates to serve data (e.g., from event database 126) in response to queries from query server 120 and/or other entities, and also manages the data to facilitate execution of count-distinct queries. In particular, data server 118 condenses data as it is stored by tracking server 116, or afterward, such as on a periodic basis (e.g., every day, every week, every month). The condensed data is then searched by the data server in response to queries.

Query server 120 operates to configure or reconfigure queries submitted (or to be submitted) to data server 118. For example, a system operator, a member, or some other entity may submit a preconfigured query or a newly configured query (e.g., in SQL) to query server 120. The query server may reconfigure the query, especially if it is a count-distinct query, for execution against the condensed data.

System 110 may include other components not illustrated in FIG. 1. For example, in some embodiments system 110 may include a profile server to maintain profiles, in a profile database, of members of the service hosted by system 110. An individual member's profile may reflect any number of attributes or characteristics of the member, including personal (e.g., gender, age or age range, interests, hobbies, member ID), professional (e.g., employment status, job title, functional area or industry, employer, skills, endorsements, professional awards), social (e.g., organizations the user is a member of, geographic area of residence, friends), educational (e.g., degree(s), university attended, other training), etc. A member's profile, or attributes or dimensions of a member's profile may be used in various ways by system components (e.g., to identify who sent a message, to identify a recipient of a status update, to record a content-delivery event).

System 110 may also store, for each member of the service hosted by system 110, a record of content items served to the member, or served for presentation to the member, and when they were served. Such a data store may be configured to allow the content server and/or other components of system 110 to quickly determine whether a particular content item was previously presented to a particular member, how many times it was presented, when it was presented, how it was presented (e.g., how prominently or where it was presented within a web page or other page of content), and/or other information. Although some of this data may duplicate what is stored in event database 126, contents of this user data store would be rapidly accessible to one or more other servers (e.g., especially content server 114), and may be used, for example, to help select a content item to serve in response to a current request.

Also, or alternatively, the functionality of the system may be distributed among the illustrated components in an alternative manner, such as by merging or further dividing functions of one or more components, or may be distributed among a different collection of components. Yet further, while implemented as separate hardware components (e.g., computer servers) in FIG. 1, one or more of portal 112, content server 114, tracking server 116, data server 118 and query server 120 may alternatively be implemented as separate software modules executing on one or more computer servers.

Figure 2:
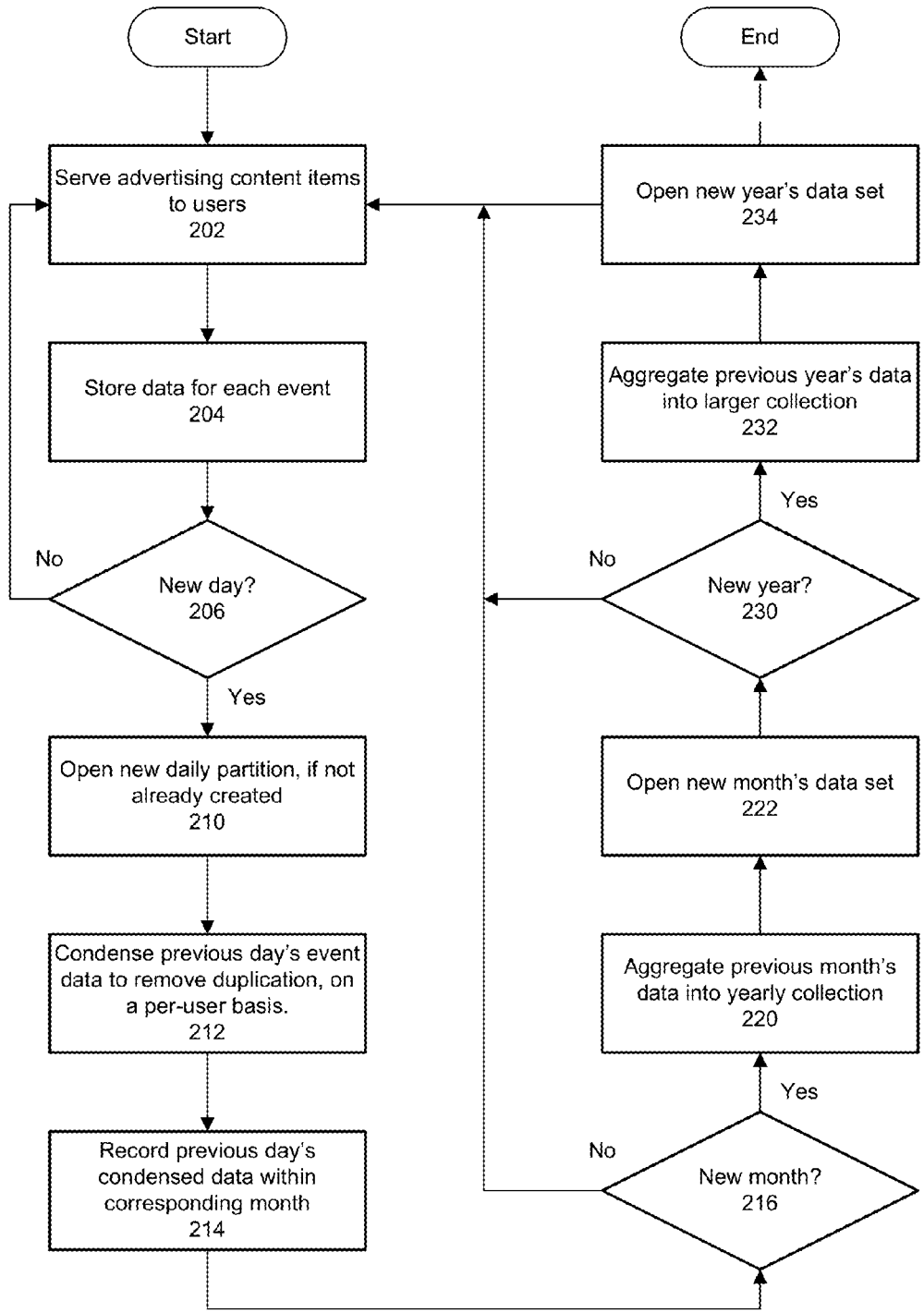
FIG. 2 is a flow chart demonstrating a method of condensing data to facilitate count-distinct queries, in accordance with some embodiments.

FIG. 2 is a flow chart demonstrating a method of condensing data to facilitate count-distinct queries, according to some embodiments.

In these embodiments, the raw data that is condensed reflects or represents content-serving events and/or content-delivery events involving a system that serves content to users, such as system 110 of FIG. 1. More particularly, the raw data comprises a record for each advertisement (and/or other sponsored content item) served to a user. The data may be stored as records in a database having a schema (e.g., a relational database), may be stored as separate files in a file system, or may be stored in some other way. References to a data record or data entry will be understood to refer to the data stored for a particular event, regardless of the form in which it is stored.

Illustratively, each record includes a timestamp identifying the time/date an advertisement (e.g., an ad impression) is served, an identifier of the advertisement, an identifier of the corresponding advertiser or sponsor, an identifier of a campaign that encompasses the advertisement, a user ID identifying the user to whom the ad was served, and/or other information. In other embodiments, the data may also or instead reflect other types of events regarding advertising content, such as clicks and/or conversions by the users to whom the ads are served. In yet other embodiments, the raw data may pertain to other types of content (e.g., audio files, images, videos) and/or other types of events.

Also, in the method illustrated in FIG. 2, data are condensed in the time dimension, and count-distinct queries will be executed for one or more other dimensions, such as user IDs. As will be understood by one of ordinary skill in the art, during the condensation process some data attributes/dimensions/fields may be discarded or obscured. In particular, data condensation involves discarding or ignoring records that contain duplicates in the dimension or dimensions in which count-distinct queries will be supported (e.g., such as the user ID field). For example, within each time period for which data are condensed, it is only necessary to reflect one serving of a particular advertisement to a particular user; additional servings are irrelevant for purposes of a count-distinct query.

In operation 202 of the illustrated method, a content-serving system, or a content server within such a system, begins or continues serving advertisements. The system may store and serve any number of ad impressions, in any number of formats (e.g., sizes, colors, composition), for any number of advertising campaigns, and for any number of advertisers or sponsors.

Further references to an "ad," "advertisement," or "impression" will be understood to refer to any type of sponsored content served by the system for which event data are recorded and, similarly, further references to an "advertiser" will be understood to refer to the sponsor of an advertisement, whether that sponsor is an individual or an organization.

In operation 204, for each event (e.g., each time an advertising content item is served to a user), a data record or data entry corresponding to the event is stored (e.g., by the server that served the content, by a server that tracks events). As mentioned above, the record for a given event may include (but is not limited to) the user ID of the destination user, a timestamp, and identifiers of the ad, the ad campaign, and the corresponding advertiser.

Because a record is created for every event, a lot of duplication may appear in the event data. For example, a given user ID will appear every time the corresponding user is served an advertisement, and he may be served a specific ad more than once. Similarly, a given advertisement ID will be repeated every time the ad is served, a given campaign ID will be repeated every time an ad from the campaign is served, and so on. In some implementations, hundreds of millions of event records may be generated and stored every day.

In operation 206, the system determines whether a new day (e.g., a twenty-four hour period that may or may not start at midnight) has started. If so, the method advances to operation 210; otherwise, the process of serving ads and recording event data continues.

In operation 210, a new data partition, file, or other data structure for storing a day's event data is created, if it does not already exist, and is opened to receive the day's event data.

The illustrated method may continue to serve content items to users and record event data (in the new day's data partition) while the following operations are conducted. Or, the serving of ads and recording of corresponding event data may be paused when some or all of the following operations are executed.

Starting in operation 212, the raw data recorded in operation 204 is condensed, in the time dimension, based on one or more desired levels of granularity. For example, if count-distinct queries are to be supported on the daily level (i.e., to enable determination of a data dimension's reach at or down to the daily level), data will need to be condensed on a daily basis. In embodiments reflected in FIG. 2, data are condensed daily, monthly and yearly, thereby allowing reach to be determined on those bases. In other embodiments, other granularities may be implemented.

Illustratively, each day's event data are condensed at the end of the day or during the next day, and added to a monthly aggregation of condensed data. Similarly, each month's collection of condensed data is added to a yearly aggregation at the end of the month, and so on.

Figure 3:
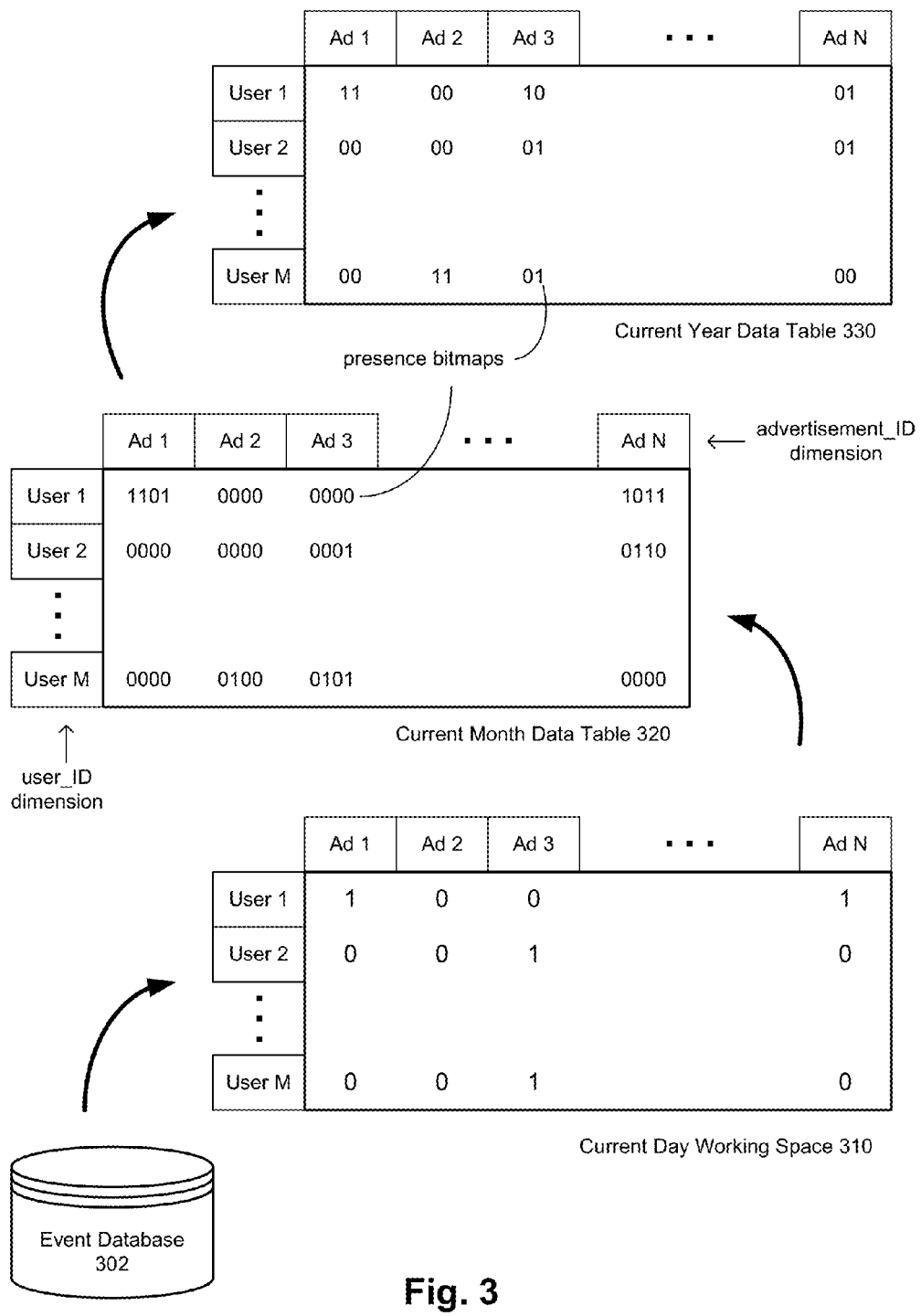
FIG. 3 illustrates condensation of raw event data and the evolution of multiple presence bitmaps at different granularities of time, in accordance with some embodiments.

FIG. 3 depicts an illustrative condensation of raw event data and the evolution of multiple presence bitmaps at different granularities of time, according to some embodiments, and will be used to illustrate some of the following operations of the method of FIG. 2.

In operation 212, the previous day's event data are condensed (e.g., by a data server) to yield a single value for each pairing of a user and an advertisement, which may be represented as a tuple in the form [user, advertisement]. In some implementations, this tuple receives the value 1 if the advertisement was served to the user during the previous day, or the value 0 if the advertisement was not served to the user during the previous day. This example assumes that count-distinct queries will be executed to identify the reach of advertisements among users (i.e., as reflected in the user ID dimension or attribute). If other types of queries are to be supported (e.g., to determine reach within some other dimension(s)), additional condensation may be performed.

For example, in addition to or instead of generating binary values for every tuple of the form [user, advertisement], the system could consider other tuples, such as [user, advertiser], which would yield the reach of each advertiser across users. Although an approximation of an advertiser's reach across all users could alternatively be calculated by determining the reach of each of the advertiser's advertisements across all users, the advertiser's reach across users will be faster and more accurate if the event data are condensed so as to directly support that type of query.

Also, the method of FIG. 2 presumes that an advertisement ID uniquely identifies each advertisement among all ads served by the system. Alternatively, if the ad ID is unique only for a given advertiser or a given campaign, the [user, advertisement] tuples referred to in this discussion may instead be of the form [user, advertiser, advertisement], [user, campaign, advertisement], [user, advertiser, campaign, advertisement], or some other form. In general, tuples for which condensed data are generated and/or queried may be of the form [S, g1, g2, . . . , gN], wherein S is a selected dimension in which count-distinct queries are supported (e.g., user ID), N≥1, and the combination of g1 through gN identifies a key grouping.

It may be noted that the illustrated method provides for reach of individual advertisements. During data condensation, every serving of a particular ad or ad impression will be treated the same, regardless of format. Alternative embodiments may be derived from this discussion to provide reach below the level of individual ads (e.g., to the different formats of the ads).

FIG. 3 depicts this initial stage of data condensation as the generation of current day working space 310 (e.g., a data table, a partition or portion of a data table) from event data stored in event database 302.

Thus, operation 212 may be processor-intensive, but yields a condensed representation of the previous day's content-serving activity, which reflects each ad impression's reach among all users.

In operation 214, the previous day's condensed data are recorded within the next higher level of granularity (i.e., month). In particular, the previous day's condensed data are aggregated with other daily condensed data of the same month, unless the previous day was the first day of the month, in which case it will be the first entry in the corresponding month's condensed data. Similarly, and as described below, each month's condensed data will be aggregated with data of other months of the same year. The resulting set of data will be easily and quickly searchable in response to count-distinct queries.

In some embodiments, condensed data of consecutive days (i.e., the binary values representing whether particular ads were served to a particular user on those days) are aggregated into one dimensional-bitmaps, which may be referred to as presence bitmaps, vectors, and/or other terms. Just as a single binary value of 1 or 0 indicates that a given ad was or was not served to a given user on a given day, a sequence of multiple binary values can be used to depict whether or not the ad was served to the user on any of several days (i.e., each day is represented by one bit).

In particular, over the course of each month, for each [user, advertisement] tuple, a bitmap is assembled that indicates, for each day, whether the advertisement was served to the user. A 32-bit bitmap may be used, which will allow for an entry for every day and may be stored as an integer value.

Thus, operation 214 entails locating and opening the appropriate month's data collection (e.g., a table) and, for each [user, advertisement] tuple, updating the corresponding presence bitmap by adding the binary value representing whether the advertisement was served to the user during the day whose data are currently being processed. In FIG. 3, this is illustrated within current month data table 320. In the illustrated example, the previous day was the fourth day of the month, and was therefore recorded in data table 320 as the $4^{th}$ element or component of the presence bitmap for the corresponding [user, advertisement] pairing.

In embodiments of the invention depicted in FIG. 2, the storage space occupied by current working space 310 (e.g., in memory, in a non-volatile storage device) is reclaimed after each daily set of data is processed and recorded at the next higher level of time granularity.

In operation 216, the system determines whether the previous month has ended (e.g., whether today is the first day of a new month). If so, the method continues with operation 220; otherwise, the method ends or returns to operation 202 to continue serving advertising content and recording event data.

In operation 220, the completed (previous) month's condensed data are aggregated into the corresponding year's collection. Similar to the manner in which each day's presence (i.e., whether a given advertisement was served to a given user) was stored as a binary value in a monthly collection, the monthly presence is now stored as a binary value in a yearly collection.

Illustratively, a bitwise OR is performed on the presence bitmap for each [user, advertisement] tuple in the month's condensed data (e.g., current month data table 320 of FIG. 3), and the result is stored as the completed month's value within the corresponding year's presence bitmap. Thus, a 1 will be stored in the tuple's yearly presence bitmap, for the completed month, if any digit in the monthly presence bitmap was a 1, thereby signifying that the advertisement was served to the user at least once in the month. Otherwise a 0 is stored.

This operation is depicted in FIG. 3, wherein, at the end of the month, the presence bitmaps of table 320 are used to populate current year data table 330. In the illustrated example, the completed month was the second month of the year (i.e., February), and was therefore recorded in yearly data table 330 as the $2^{nd}$ element or component of the presence bitmap for the corresponding [user, advertisement] pairing.

In operation 222, a new monthly data set is opened or prepared for the new month, to receive daily condensed data during the new month. For example, a separate data table may be opened every month, a separate partition may be created within a database, a separate folder may be opened in a file system, etc.

In operation 230, the system determines whether the previous year has ended (i.e., whether today is January 1). If so, the method continues with operation 232; otherwise, the method ends or returns to operation 202 to continue serving advertising content and recording event data.

In operation 232, the previous year's condensed data are aggregated into a larger collection (e.g., a permanent collection, a decennial collection). Just as each month's presence (i.e., whether a given advertisement was served to a given user in the month) was stored as a binary value in the previous year's data collection, the yearly presence can now be stored as a binary value in the larger collection.

Illustratively, a bitwise OR is performed on the presence bitmap for each [user, advertisement] yearly tuple, and the result is stored as the completed year's value for that tuple. Thus, a 1 will be stored for the completed year if any digit in that year's presence bitmap was a 1, thereby signifying that the advertisement was served to the user at least once in the corresponding month. Otherwise a 0 is stored.

In operation 234, a new yearly data set is opened or prepared for the new year to store presence bitmaps. For example, a separate data table may be opened, a separate partition may be created within a database, etc.

After operation 234, the illustrated method may end or may return to operation 202 to continue serving advertisement content and recording event data.

In some embodiments, a single data table may be used to store condensed data at multiple (or all) time granularities (e.g., day, month, year). This table might comprise one dimension for each level of granularity in the time attribute (or other attribute) that is condensed. In the method of FIG. 2, for example, a first (daily) dimension would be assembled for every day (e.g., as a working space) as its event data are condensed to produce binary values for every [user, advertisement] tuple. That daily data would then be aggregated into a second (monthly) dimension, where it would be used to update or extend the month's presence bitmap representing whether or not the advertisement was served to the user.

The monthly data would then be aggregated into a third (yearly) dimension of the table, wherein the month-long (e.g., 32-bit) presence bitmap or vector for a particular [user, advertisement] pairing is used to determine the binary value to be stored in the year-long (e.g., 12-bit) presence bitmap or vector for the same tuple. An additional, higher, dimension might be implemented for a decade, a score, or any number of years.

Tables 320, 330 of FIG. 3 are illustrative monthly and yearly tables for collecting condensed data for all [user, advertisement] pairings, which may assume that an advertisement ID is unique among all advertisers. Other table configurations or collections of tables may be used in other embodiments. For example, to support count-distinct queries over tuples of the form [user, advertiser, advertisement], tables 320 and 330 may be extended such that each advertisement ID (e.g., Ad 1, Ad 2) is replaced by a unique combination of advertiser and advertisement (e.g., Advertiser1/Ad1, Advertiser1/Ad2, . . . , Advertiser2/Ad1, . . . ). As one alternative, separate copies of tables 320, 330 may be implemented for each unique advertiser.

Figure 4:
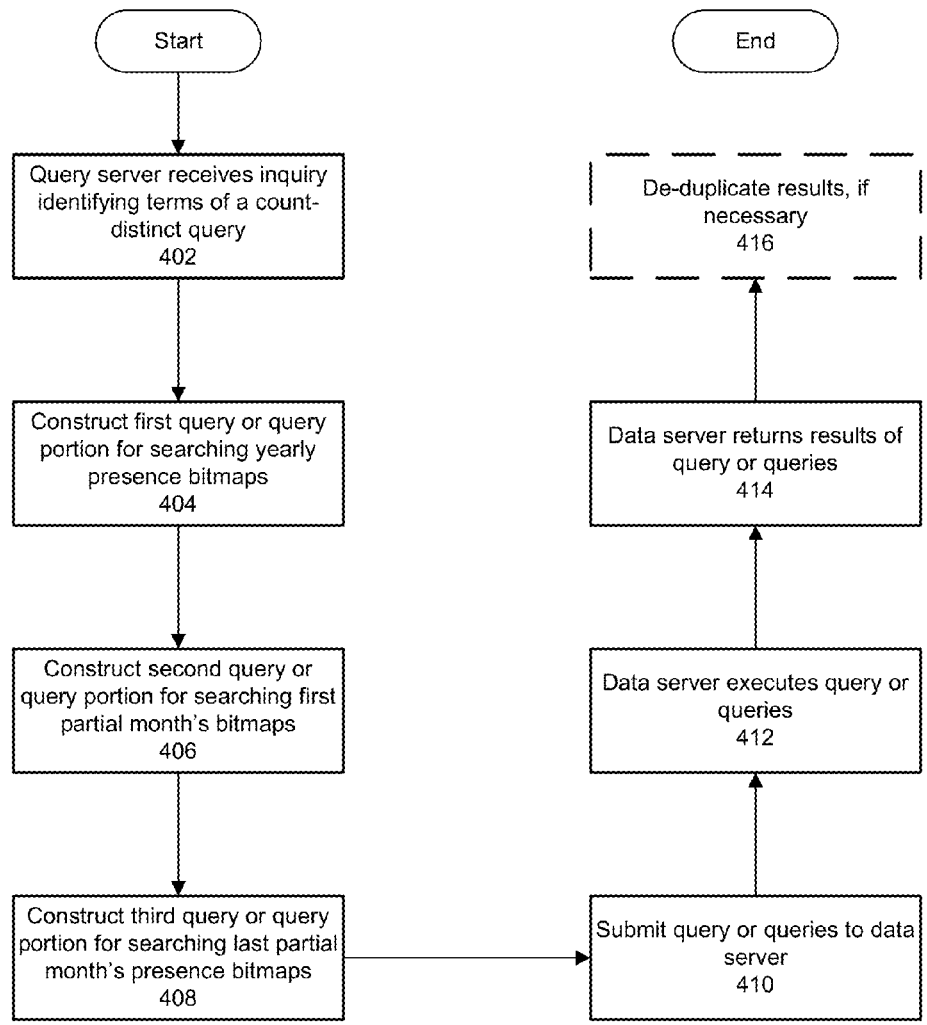
FIG. 4 is a flow chart demonstrating a method of performing a count-distinct query, in accordance with some embodiments.

FIG. 4 is a flow chart demonstrating a method of executing a count-distinct query against condensed data, according to some embodiments. In the embodiments of FIG. 4, the data have been condensed using a method illustrated and described in conjunction with FIG. 2, or a process that may be readily derived from that method.

In particular, the data represent events regarding the serving and/or delivery of advertising content, and include presence bitmaps that indicate whether a particular user was served or acted on a particular advertisement. Thus, a yearly presence bitmap for the [user, advertisement] pairing includes twelve bits or values identifying, for each month of the year, whether the ad was served to the user. Similarly, monthly presence bitmaps for every month of the year include a value for every day of the month, which indicates whether the ad was served to the user that day. Illustratively, the value 1 indicates that the ad was served to the user and the value 0 indicates that it was not served to the user Additional time granularity may be employed to reflect activity within hours of a day, within minutes of an hour, within years of a decade, etc.

A count-distinct query may be submitted by an operator or administrator of the content-serving system, by an advertiser, by a member of a service offered by the system, or someone else. The query may be submitted and executed in SQL (Structured Query Language) form, may be submitted and executed in a proprietary form, or may be submitted in SQL and then converted for execution against the condensed data.

For example, a query server may offer an interface that allows a user or administrator to configure a count-distinct query by selecting the data dimension in which distinctness is desired (e.g., user ID), identifying relevant predicates (e.g., advertiser ID, advertisement ID), specifying a data range, etc. The query server may then format the query parameters appropriately, submit the query to the data server that maintains the condensed data, and receive and display the results.

In operation 402 of the method of FIG. 4, a query server receives an inquiry or a description of a query to pose to the data server. As described above, the submitter of the inquiry may simply operate an interface that allows him or her to select desired parameters without using or knowing SQL or any other query language.

Illustratively, the inquiry submitted to the query server indicates that the person who submitted the inquiry wants to know the reach of a particular advertisement (i.e., advertisement ID) of a particular advertiser (i.e., advertiser ID), among all users (i.e., user ID), from Feb. 16, 2013 through Sep. 15, 2013.

From the received inquiry or specified parameters, the query server will format one or more queries to deliver to the data server. For this example inquiry, and because of the manner in which data are condensed, one multi-part query or multiple separate queries will be required. In particular, the data server can refer to yearly presence bitmaps for the year 2013 to find the necessary data for entire months (e.g., March through August), but also will have to look at monthly presence bitmaps of February, 2013 (for the period February 16 through February 28) and September, 2013 (for the period September 1 through September 15). To slightly expedite the search, at the cost of accuracy, the data server could use the yearly bitmaps to determine presence during February and September, but the result may not be correct.

In operation 404, the query server configures a first query or a first part of a multi-part query, to search yearly bitmaps for the months of March through August). This may be a yearly data table for the year 2013, which may be similar to table 330 of FIG. 3. Based on the inquiry, this query or query portion may be similar to:

---

Select DISTINCT(user_ID) from Data_Table
where (granularity = "year" & yearMonth = "2013")
& (advertiser_ID = "Adr42" & advertisement_ID = "Adm3891")
& (presence_bitmap && CONST1 > 0)

---

The first line of this query or query portion indicates that a distinct count over the user_ID field is desired, from a database or other collection of data identified as "Data_Table." Illustratively, the Data_Table table has multiple partitions or portions corresponding to the values for "granularity." Thus, there are one or more yearly partitions, for example, one of which is labeled "2013" and is targeted by the second line. In the third line, the advertiser and advertisement targeted by the inquiry are identified.

The fourth line of the query or query portion uses a bitwise comparison to compare the presence bitmaps, in the specified data table partition that correspond to the specified advertiser and advertisement, with a specified constant value. Specifically, CONST1 is a bitmap, of the same length/format of the stored presence bitmaps, with a 1 in every position that corresponds to a month that is targeted by this query or query portion, and a 0 in every other position. Thus, for the current inquiry, CONST1=[001111111000], meaning that the fourth line of the query or query portion will be true for each [user, advertiser, advertisement] tuple's bitmap that has a 1 for any of the months March through August.

It may be noted that presence bitmaps and the CONST values used in queries may be stored in decimal notation, but compared at the bit level. Alternatively, they may be stored in binary format.

Instead of the DISTINCT query depicted above, a COUNT variant of the original inquiry may be executed in situations in which the date range does not include any partial time periods. For example, consider the period of Mar. 1, 2013 through Aug. 31, 2013 (inclusive). A COUNT variant for this example may be identical or similar to:

```
         Select COUNT(user_ID) from Data_Table
    where (granularity = "year" & yearMonth = "2013")
    & (advertiser_ID = "Adr42" & advertisement_ID = "Adm3891")
              & (presence_bitmap && CONST1 > 0)
```

In this example, because there are no partial months, a COUNT DISTINCT query is transformed into a COUNT query that is simpler and that executes more efficiently. In particular, a COUNT DISTINCT query requires all user_ID values to be shuffled between MAPPER and REDUCER functions for de-duplication, for every grouping key. A COUNT query, however, only requires the count of the number of members of each group to be shuffled. Thus, the COUNT query can execute faster.

In operation 406, the query server configures a second query or query portion corresponding to the partial month at the beginning of the date range, which may be similar to:

```
        Select DISTINCT(user_ID) from Data_Table
    where (granularity = "month" & yearMonth = "201302")
    & (advertiser_ID = "Adr42" & advertisement_ID = "Adm3891")
              & (presence_bitmap && CONST2 > 0)
```

In this query/query portion, a monthly partition of the data table corresponding to February, 2013 (yearMonth="201302") is searched. A different constant value, CONST2 is used to determine how many users the specified advertisement was served to during February 16 through February 28. In particular, CONST2= [0000000000000001111111111111], and a bitwise comparison of CONST2 with each presence bitmap for the advertisement will yield a distinct count.

In operation 408, the query server configures a final query or query portion corresponding to the partial month at the end of the date range, which may be similar to:

```
        Select DISTINCT(user_ID) from Data_Table
    where (granularity = "month" & yearMonth = "201309")
    & (advertiser_ID = "Adr42" & advertisement_ID = "Adm3891")
              & (presence_bitmap && CONST3 > 0)
```

In this query/query portion, the monthly partition of the data table corresponding to September, 2013 (yearMonth="201309") is searched. The constant value CONST3 is used to determine how many users the specified advertisement was served to during September 1 through September 15. In particular, CONST3= [111111111111111000000000000000], and a bitwise comparison of CONST3 with each presence bitmap for the advertisement will yield a distinct count.

In operation 410, the multiple queries, or a single query comprising all three portions, are submitted to the data server for execution. A single query comprising all three portions may be similar to:

```
        Select COUNT(distinct user_ID) from Data_Table
    where (advertiser_ID = "Adr42" & advertisement_ID = "Adm3891")
                             &
         [ [ (granularity = "year" & yearMonth = "2013")
              & (presence_bitmap && CONST1 > 0) ]
        OR [ (granularity = "month" & yearMonth = "201302")
              & (presence_bitmap && CONST2 > 0) ]
        OR [ (granularity = "month" & yearMonth = "201309")
              & (presence_bitmap && CONST3 > 0) ] ]
```

In operation 412, the data server executes the query or queries and, in operation 414, returns the results.

In the method of FIG. 4, if a single query is executed, of the form indicated above, a single value may be returned that is the distinct count of servings of the specified advertiser's specified advertisement, among all users. If, however, the three separate DISTINCT queries above are executed, then three separate lists of user_IDs are returned that must be de-duplicated. In other words, with three separate queries, a given user may be reported more than one time.

In optional operation 416, the query results are de-duplicated (e.g., by the query server, by a content server) if necessary.

To facilitate de-duplication, the three queries assembled in operations 404, 406, 408 may be combined and executed within an overall COUNT DISTINCT query that de-duplicates automatically among the three queries. For example, in operation 410 the assembled queries may be submitted for execution in a form similar to the following:

```
              SELECT COUNT(distinct user_ID) from
                               (
              Select DISTINCT(user_ID) from Data_Table
        where (granularity = "year" & yearMonth = "2013")
    & (advertiser_ID = "Adr42" & advertisement_ID = "Adm3891")
              & (presence_bitmap && CONST1 > 0)
                             UNION
              Select DISTINCT(user_ID) from Data_Table
        where (granularity = "month" & yearMonth = "201302")
    & (advertiser_ID = "Adr42" & advertisement_ID = "Adm3891")
              & (presence_bitmap && CONST2 > 0)
                             UNION
              Select DISTINCT(user_ID) from Data_Table
        where (granularity = "month" & yearMonth = "201309")
    & (advertiser_ID = "Adr42" & advertisement_ID = "Adm3891")
              & (presence_bitmap && CONST3 > 0)
                               )
```

In an illustrative variant of the data structures for storing condensed data that are described above and/or pictured in FIG. 3, a full year's condensed data for each user may be stored in a single presence bitmap. In this illustrative variant, for each distinctive data grouping, such as [user, advertisement], [user, advertiser, advertisement], etc., a separate bitmap (e.g., 48 bytes long) includes a bit position for each day of the year. Each day's raw data are condensed and used to configure the appropriate bit within the appropriate tuple's bitmap.

One advantage of this format (i.e., a single, yearlong, daily presence bitmap) is that a COUNT query can be executed in place of a COUNT DISTINCT query if the start and end dates of an inquiry fall within the same year, because de-duplication was performed during data condensation and formation of the bitmap.

Figure 5:
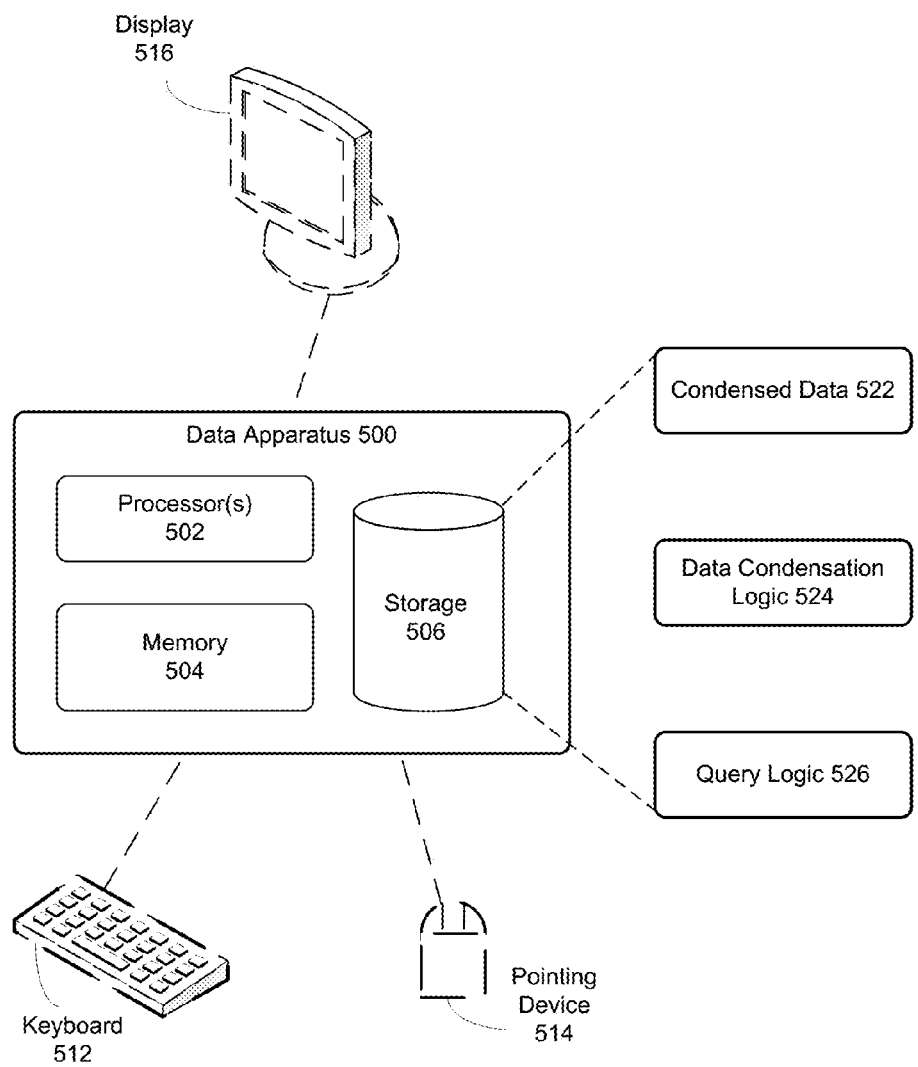
FIG. 5 is a block diagram of an apparatus for supporting count-distinct queries, in accordance with some embodiments.

FIG. 5 is a block diagram of an apparatus for supporting count-distinct queries, according to some embodiments.

Data apparatus 500 of FIG. 5 comprises processor(s) 502, memory 504 and storage 506, which may comprise one or more optical, solid-state and/or magnetic storage components. Storage 506 may be local or remote to the apparatus. Data apparatus 500 may be coupled (permanently or transiently) to keyboard 512, pointing device 514, and display 516.

Storage 506 stores condensed data 522, which may include de-duplicated forms (or representations of de-duplicated forms) of original data. Illustratively, the original data may be generated in the course of serving and/or delivering online content, or may have other origins. As described previously, condensed data 522 may be configured as one or more tables, partitions, files, directories, or other structures, and includes multiple partitions for different granularities or windows of time (or some other data dimension). The condensed data may omit some attributes or dimensions of the original data, but does include those attributes or dimensions necessary to support count-distinct queries on a user dimension and/or other dimensions. The original data may be stored external to apparatus 500 or, alternatively, may be included in storage 506.

Storage 506 also stores logic that may be loaded into memory 504 for execution by processor(s) 502. Such logic includes data condensation logic 524 and query logic 526. In other embodiments, these logic modules and/or other content may be combined or divided to aggregate or separate their functionality as desired.

Data condensation logic 524 comprises processor-executable instructions for generating and augmenting condensed data 522 from the original data. As discussed in relation to FIG. 2, for example, daily data may be condensed and recorded in monthly data structures (e.g., presence bitmaps) to succinctly summarize the uniqueness of one or more target dimensions (e.g., user ID).

Query logic 526 comprises processor-executable instructions for generating and/or executing count-distinct queries for condensed data 522. Logic 526 may therefore enable a user or system operator to create a query, may reformat a query received in another form (e.g., SQL), and may execute the query. As described above, one count-distinct inquiry may be divided into multiple queries or reformatted as a multi-part query, depending on the terms and the form of the condensed data.

In some embodiments of the invention, data apparatus 500 performs most or all of the functions described in relation to data server 118, and possibly query server 120, of FIG. 1. In some particular implementations, apparatus 500 may host multiple virtual computer servers performing the functions of server 118, 120 (and/or others) of FIG. 1.

An environment in which some embodiments of the invention are executed may incorporate a general-purpose computer or a special-purpose device such as a hand-held computer or communication device. Some details of such devices (e.g., processor, memory, data storage, display) may be omitted for the sake of clarity. A component such as a processor or memory to which one or more tasks or functions are attributed may be a general component temporarily configured to perform the specified task or function, or may be a specific component manufactured to perform the task or function. The term "processor" as used herein refers to one or more electronic circuits, devices, chips, processing cores and/or other components configured to process data and/or computer program code.

Data structures and program code described in this detailed description are typically stored on a non-transitory computer-readable storage medium, which may be any device or medium that can store code and/or data for use by a computer system. Non-transitory computer-readable storage media include, but are not limited to, volatile memory, non-volatile memory, magnetic and optical storage devices such as disk drives, magnetic tape, CDs (compact discs) and DVDs (digital versatile discs or digital video discs), solid-state drives and/or other non-transitory computer-readable media now known or later developed.

Methods and processes described in the detailed description can be embodied as code and/or data, which may be stored in a non-transitory computer-readable storage medium as described above. When a processor or computer system reads and executes the code and manipulates the data stored on the medium, the processor or computer system performs the methods and processes embodied as code and data structures and stored within the medium.

Furthermore, the methods and processes may be programmed into hardware modules such as, but not limited to, application-specific integrated circuit (ASIC) chips, field-programmable gate arrays (FPGAs), and other programmable-logic devices now known or hereafter developed. When such a hardware module is activated, it performs the methods and processed included within the module.

The foregoing embodiments have been presented for purposes of illustration and description only. They are not intended to be exhaustive or to limit the invention to the forms disclosed. Accordingly, many modifications and variations will be apparent to practitioners skilled in the art. The scope of the invention is defined by the appended claims, not the preceding disclosure.

What is claimed is:

1. A method of determining distinctiveness within multi-dimensional data condensed in a selected dimension, the method comprising:
receiving a query regarding distinctiveness of the multi-dimensional data within a specified range of time, across:
the selected dimension; and
one or more dimensions other than the selected dimension;
for each unique key comprising a value in the selected dimension and values in the one or more other dimensions, accessing, with a computer, at least one associated presence bitmap comprising separate indicators corresponding to each of multiple time periods; and
aggregating a count of unique keys for which at least one associated presence bitmap comprises an indicator having a first value and corresponding to a time period within the specified range of time.

2. The method of claim 1, wherein each indicator within a presence bitmap is one of:
the first value indicating that at least one record comprising the associated unique key was added to the multi-dimensional data during the corresponding time period; and
a second value indicating that no record comprising the associated unique key was added to the multi-dimensional data during the corresponding time period.

3. The method of claim 1, wherein a first presence bitmap corresponds to a month and comprises:
for each day of the month, a corresponding daily indicator configured to indicate whether at least one record created in the multi-dimensional data during the day comprises the associated unique key.

4. The method of claim 3, wherein a second presence bitmap corresponds to a year and comprises:
for each month of the year, a corresponding monthly indicator configured to indicate whether at least one record created in the multi-dimensional data during the month comprises the associated unique key.

5. The method of claim 1, wherein a first presence bitmap corresponds to a year and comprises:
for each day of the year, a corresponding daily indicator configured to indicate whether at least one record created in the multi-dimensional data during the day comprises the associated unique key.

6. The method of claim 1, wherein a first presence bitmap corresponds to a year and comprises:
for each week of the year, a corresponding daily indicator configured to indicate whether at least one record created in the multi-dimensional data during the week comprises the associated unique key.

7. The method of claim 1, further comprising, prior to said accessing:

identifying presence bitmaps comprising indicators corresponding to time periods encompassed by the range of time, including the at least one presence bitmap.

8. The method of claim 1, wherein said aggregating comprises:

for each presence bitmap associated with a given unique key and comprising one or more indicators corresponding to time periods within the range of time, performing a bit-wise OR between the presence bitmap and a constant value.

9. The method of claim 8, wherein:

the constant value comprises a separate bit pertaining to each indicator of the presence bitmap, each bit having:

the first value if the pertinent indicator corresponds to a time period within the range of time; and a second value if the pertinent indicator corresponds to a time period not within the range of time.

10. The method of claim 1, wherein:

the query is a COUNT DISTINCT query; and accessing the at least one presence bitmap comprises executing a COUNT query on the at least one presence bitmap instead of executing the COUNT DISTINCT query on the multi-dimensional data.

11. A system, comprising:

a first data repository storing multi-dimensional data, each multi-dimensional data record comprising:

a selected dimension; and one or more dimensions other than the selected dimension;

a second data repository storing presence bitmaps representing the multi-dimensional data as condensed in the selected dimension, wherein each presence bitmap is associated with a unique key comprising a value in the selected dimension and values in the one or more other dimensions; and a query module comprising a non-transitory computer readable medium storing instructions for:

receiving a query regarding distinctiveness of the multi-dimensional data within a specified range of time, across the selected dimension and the one or more other dimensions;

accessing one or more presence bitmaps, each accessed presence bitmap comprising one or more indicators that each correspond to a time period within the range of time; and aggregating a count of unique keys associated with an accessed presence bitmap that comprises at least one indicator corresponding to a time period within the range of time and has a first value;

wherein the first value indicates that at least one record created in the multi-dimensional data during the corresponding time period comprises the unique key.

12. The system of claim 11, wherein the non-transitory computer readable medium of the query module further stores instructions for:

converting a COUNT DISTINCT query targeting the first data repository into a substitute COUNT query targeting the second data repository.

13. The system of claim 11, wherein:

a first presence bitmap corresponds to a month and comprises:

for each day of the month, a corresponding daily indicator configured to indicate whether at least one multi-dimensional data record created during the day comprises the associated unique key.

14. The system of claim 13, wherein:

a second presence bitmap is associated with a year and comprises:

for each month of the year, a corresponding monthly indicator configured to indicate whether at least one multi-dimensional data record created during the month comprises the associated unique key.

15. The system of claim 11, wherein:

a first presence bitmap corresponds to a year and comprises:

for each predetermined time period of the year, a corresponding indicator configured to indicate whether at least one multi-dimensional data record created during the first time period comprises the associated unique key.

16. The system of claim 15, wherein the predetermined time period is a day.

17. The system of claim 11, further comprising:

a condenser module comprising a non-transitory computer readable medium storing instructions for, after termination of a first repeating time period:

for each unique key, configuring a first presence bitmap associated with the first time period to indicate whether at least one multi-dimensional data record created during the first time period comprises the unique key.

18. Apparatus for determining distinctiveness within multi-dimensional data condensed in a selected dimension, the apparatus comprising:

one or more processors;

a data repository comprising presence bitmaps representing the condensed multi-dimensional data, wherein each presence bitmap is associated with a unique key comprising a value in the selected dimension and values in one or more other dimensions of the multi-dimensional data, and comprises:

for each of multiple repeating time periods, a corresponding indicator configured to indicate whether a record created in the multi-dimensional data during the time period comprises the unique key; and memory storing instructions that, when executed by the one or more processors, cause the apparatus to:

receive a query regarding distinctiveness of the multi-dimensional data within the selected dimension and the one or more other dimensions during a range of time; and computing a number of unique keys associated with at least one presence bitmap having at least one indicator corresponding to a given time period during the range of time and indicating that a record having the unique key was created in the multi-dimensional data during the given time period.

19. The apparatus of claim 18, wherein:

a first presence bitmap corresponds to a month and comprises:

for each day of the month, a corresponding daily indicator configured to indicate whether at least one multi-dimensional data record created during the day comprises the associated unique key; and a second presence bitmap is associated with a year and comprises:

for each month of the year, a corresponding monthly indicator configured to indicate whether at least one multi-dimensional data record created during the month comprises the associated unique key.

20. The apparatus of claim 18, wherein:
a first presence bitmap corresponds to a year and comprises:
for each predetermined repeating time period of the year, a corresponding indicator configured to indicate whether at least one multi-dimensional data record created during the predetermined time period comprises the associated unique key.

\* \* \* \* \*